United States Patent
Miki et al.

(10) Patent No.: US 8,971,902 B2
(45) Date of Patent: Mar. 3, 2015

(54) MOBILE COMMUNICATION SYSTEM, CONTROLLER AND METHOD

(75) Inventors: Nobuhiko Miki, Yokohama (JP); Mamoru Sawahashi, Yokohama (JP); Kenichi Higuchi, Saitama (JP)

(73) Assignee: NTT DOCOMO, INC., Tokyo (JP)

( * ) Notice: Subject to any disclaimer, the term of this patent is extended or adjusted under 35 U.S.C. 154(b) by 543 days.

(21) Appl. No.: 12/740,881

(22) PCT Filed: Oct. 31, 2008

(86) PCT No.: PCT/JP2008/069959
§ 371 (c)(1),
(2), (4) Date: Aug. 31, 2010

(87) PCT Pub. No.: WO2009/057782
PCT Pub. Date: May 7, 2009

(65) Prior Publication Data
US 2010/0317357 A1 Dec. 16, 2010

(30) Foreign Application Priority Data
Nov. 2, 2007 (JP) .................... 2007-286738

(51) Int. Cl.
*H04W 72/00* (2009.01)
*H04J 13/00* (2011.01)
(Continued)

(52) U.S. Cl.
CPC ............. *H04J 13/00* (2013.01); *H04J 13/0003* (2013.01); *H04L 5/0028* (2013.01); *H04J 13/16* (2013.01)
USPC ..................... 455/450; 455/552.1; 455/553.1

(58) Field of Classification Search
CPC ..... H04W 28/22; H04W 36/14; H04W 36/26; H04W 48/18; H04W 72/1284; H04W 72/1289; H04W 76/02; H04W 88/08; H04W 88/10
USPC ..................... 455/450, 552.1, 553.1
See application file for complete search history.

(56) References Cited

U.S. PATENT DOCUMENTS

| 7,917,151 B2 * | 3/2011 | Gessner et al. ............... 455/455 |
| 2003/0100308 A1 | 5/2003 | Rusch |

(Continued)

FOREIGN PATENT DOCUMENTS

| JP | 2002-198891 A | 7/2002 |
| JP | 2005-217515 A | 8/2005 |

(Continued)

OTHER PUBLICATIONS

Japanese Office Action for Application No. 2007-286738, mailed on Apr. 17, 2012 (4 pages).
Patent Abstracts of Japan, Publication No. 2007-266696, dated Oct. 11, 2007, 1 page.

(Continued)

*Primary Examiner* — Olumide T Ajibade Akonai
*Assistant Examiner* — Edward Zhang
(74) *Attorney, Agent, or Firm* — Osha Liang LLP

(57) ABSTRACT

A mobile communication system includes a first assignment unit configured to assign radio resources to a user in a W-CDMA system, a second assignment unit configured to assign radio resources to a user in a LTE system, a dual mode terminal capable of communicating in the W-CDMA system and the LTE system, and a selection unit configured to select the first assignment unit or the second assignment unit depending on a type of user traffic data in communication with the dual mode terminal. The assignment unit selected by the selection unit determines which of the radio resources is available for the dual mode terminal and signals the determined radio resources to the dual mode terminal.

8 Claims, 5 Drawing Sheets

(51) Int. Cl.
*H04L 5/00* (2006.01)
*H04J 13/16* (2011.01)

(56) References Cited

U.S. PATENT DOCUMENTS

| | | | |
|---|---|---|---|
| 2004/0022265 A1* | 2/2004 | Luz et al. | 370/466 |
| 2005/0181822 A1* | 8/2005 | Sasaki et al. | 455/552.1 |
| 2006/0128394 A1* | 6/2006 | Turina et al. | 455/453 |
| 2006/0166699 A1* | 7/2006 | Aghvami et al. | 455/552.1 |
| 2007/0171868 A1 | 7/2007 | Furuskar et al. | |
| 2008/0002647 A1* | 1/2008 | Laroia et al. | 370/338 |
| 2008/0119183 A1* | 5/2008 | Kono | 455/432.1 |
| 2009/0068969 A1* | 3/2009 | Lindoff et al. | 455/161.1 |

FOREIGN PATENT DOCUMENTS

| | | |
|---|---|---|
| JP | 3845088 B2 | 8/2006 |
| JP | 2007-243425 A | 9/2007 |
| JP | 2007-266696 A | 10/2007 |
| WO | 03/084273 A1 | 10/2003 |
| WO | 2007037016 A1 | 4/2007 |

OTHER PUBLICATIONS

Patent Abstracts of Japan, Publication No. 2007-243425, dated Sep. 20, 2007, 1 page.
Patent Abstracts of Japan, Publication No. 2005-217515, dated Aug. 11, 2005, 1 page.
Patent Abstracts of Japan, Publication No. 2002-198891, dated Jul. 12, 2002, 1 page.
3GPP TS 25.308 V5.7.0, Dec. 2004, "High Speed Downlink Packet Access (HSDPA), Overall description; Stage 2 (Release 5)," 28 pages.
3GPP TS 25.309 V6.6.0, Mar. 2006, "FDD Enhanced Uplink; Overall description; Stage 2 (Release 6)," 34 pages.
3GPP TS 36.211 V8.0.0, Sep. 2007, "Evolved Universal Terrestrial Radio Access (E-UTRA); Physical channels and modulation (Release 8)," 50 pages.
International Search Report issued in PCT/JP2008/069959, mailed on Dec. 2, 2008, with translation, 9 pages.
Written Opinion issued in PCT/JP2008/069959, mailed on Dec. 2, 2008, 3 pages.
Extended European Search Report issued in counterpart European Patent Application No. 08845007.7 dated Oct. 6, 2014 (8 pages).

* cited by examiner

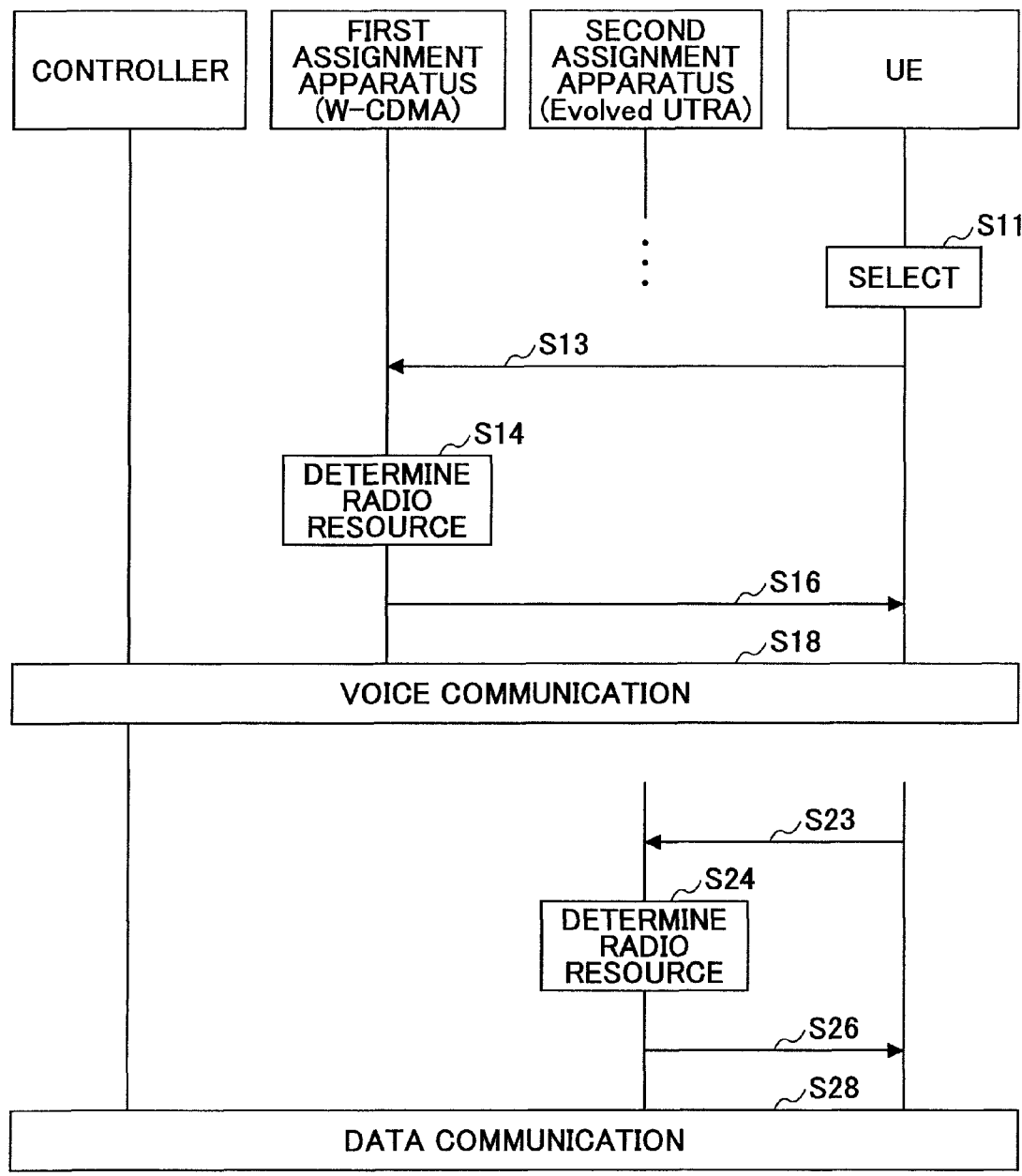

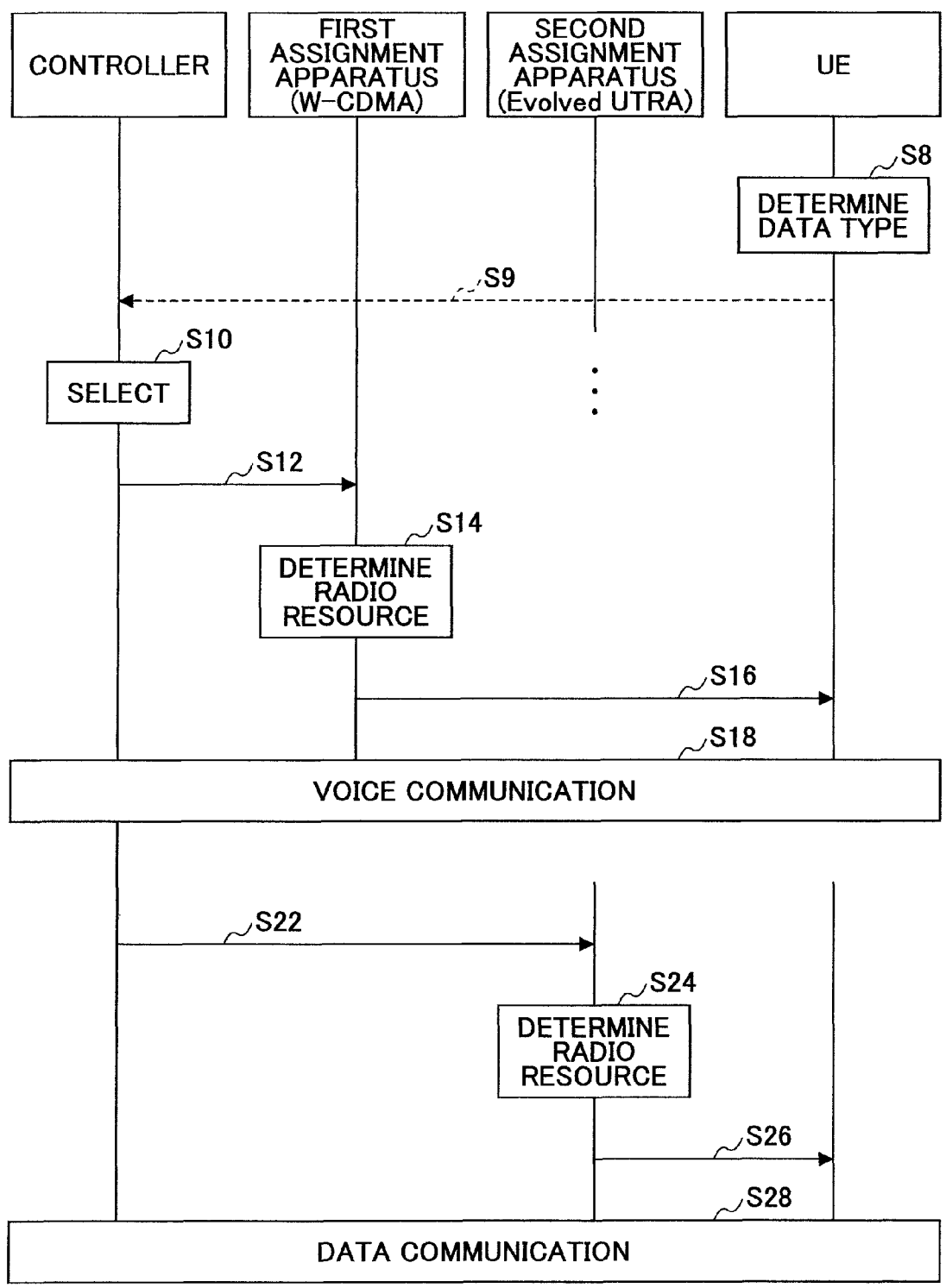

MOBILE COMMUNICATION SYSTEM, CONTROLLER AND METHOD

TECHNICAL FIELD

The present invention relates to mobile communication systems, controllers and and methods.

BACKGROUND ART

In this technical field, an IMT 2000 system is conventionally employed. In the conventional IMT 2000 system, a W-CDMA (Wideband-Code Division Multiple Access) scheme is premised, and a HSDPA (High Speed Downlink Packet Access) scheme, a HSUPA (High Speed Uplink Packet Access) scheme and other schemes are also employed. See 3GPP TS 25.308, "Technical Specification Group Radio Access Network; High Speed Downlink Packet Access (HSDPA); Overall description; Stage 2" and 3GPP TS 25.309, "Technical Specification Group Radio Access Network; FDD Enhanced Uplink; Overall description; Stage 2", for example, regarding the conventional IMT 2000 system.

On the other hand, the W-CDMA standardization group 3GPP is studying the next generation mobile communication system. This system is called an Evolved-UTRA system or a LTE (Long Term Evolution) system. In this LTE system, OFDM (Orthogonal Frequency Division Multiplexing) and SC-FDMA (Single Carrier-Frequency Division Multiple Access) schemes are utilized as radio access schemes for downlinks and uplinks, respectively. For example, see 3GPP TS 36.211 (V8·0·0), September 2007.

The OFDM scheme is a multi-carrier transmission scheme where a frequency band is segmented into multiple smaller frequency bands (subcarriers) and data is transmitted in the individual subcarriers. The subcarriers are orthogonally and densely arranged on a frequency axis, which can achieve faster transmission and improve frequency utilization efficiency. The SC-FDMA scheme is a single-carrier transmission scheme where a frequency band is segmented for different terminals and the divided frequency bands are used by the different terminals for transmissions. According to the SC-FDMA scheme, not only can interference between the terminals be easily and effectively reduced but also variations of transmit power can be suppressed. As a result, the SC-FDMA scheme is preferred from some standpoints such as reduced power consumption for terminals and wider coverage.

In the future, the W-CDMA system and the LTE system may coexist at least in a time period, and there is a likelihood that a dual mode terminal capable of operating in the both systems may be utilized. Since the W-CDMA system and the LTE system use different radio access technologies, they may be operated separately from each other.

Meanwhile, the LTE system may be particularly preferred from the standpoint of fast or large capacity data communications while the W-CDMA may be preferred in voice data communications. However, if both systems are operated separately, it could not be expected to make efficient use of radio resources in consideration of these characteristics.

DISCLOSURE OF INVENTION

Problem to be Solved by the Invention

One object of the present invention is to efficiently assign radio resources to a dual mode terminal that can communicate in both the W-CDMA system and the LTE system.

Means for Solving the Problem

A mobile communication system for use in the present invention includes a first assignment unit configured to assign radio resources to a user in a W-CDMA system, a second assignment unit configured to assign radio resources to a user in a LTE system, a dual mode terminal capable of communicating in the W-CDMA system and the LTE system, and a selection unit configured to select the first assignment unit or the second assignment unit depending on a type of user traffic data in communication with the dual mode terminal. The assignment unit selected by the selection unit determines which of the radio resources is available for the dual mode terminal and signals the determined radio resources to the dual mode terminal.

Advantage of the Invention

According to the present invention, radio resources can be assigned to a dual mode terminal that can communicate in both the W-CDMA system and the LTE system.

BRIEF DESCRIPTION OF DRAWINGS

FIG. 4 is a flowchart illustrating an exemplary second operation according to one embodiment of the present invention; and FIG. 5 is a flowchart illustrating an exemplary third operation according to one embodiment of the present invention.

LIST OF REFERENCE SYMBOLS

NodeB: W-CDMA base station
eNB: LTE base station
UE: user apparatus
RNC: radio network controller

BEST MODE FOR CARRYING OUT THE INVENTION

According to one embodiment of the present invention, a mobile communication system is employed. The mobile communication system includes a selection unit for selecting an assignment unit in a W-CDMA system (first assignment unit) or an assignment unit in a LTE system (second assignment unit) depending on a type of user traffic data in communications with a dual mode terminal. The assignment unit selected by the selection unit determines radio resources for the dual mode terminal and signals the determination to the dual mode terminal.

The first assignment unit may be installed in a base station in the W-CDMA system.

The first assignment unit may be installed in a radio network controller for controlling the base station in the W-CDMA system.

The second assignment unit may be installed in a base station in the LTE system.

The selection unit may make the selection based on whether the user traffic data corresponds to periodically arising data.

The selection unit may have determination criteria of selecting the first assignment unit if the user traffic data corresponds to periodically arising data.

The selection unit may have determination criteria of selecting the second assignment unit if the user traffic data does not correspond to periodically arising data.

The selection unit may make the selection depending on degrees of congestion of the W-CDMA system and the LTE system.

According to one embodiment, a controller is used in a composite communication system. The composite communication system includes a first assignment unit for assigning radio resources to a user in a W-CDMA system, a second assignment unit for assigning radio resources to a user in a LTE system and a dual mode terminal in communication with the W-CDMA system and the LTE system. The controller includes a selection unit configured to select the first assignment unit or the second assignment unit depending on a type of user traffic data in communication with the dual mode terminal and a signaling unit configured to signal the first or the second assignment unit that the selection has been made so that the selected assignment unit determines which of the radio resources is available for the dual mode terminal and signals the determined radio resources to the dual mode terminal.

The embodiments are described by means of specific numerals in order to facilitate understandings of the present invention. Unless specifically stated otherwise, however, these numerals are simply illustrative, and any other appropriate value may be used.

FIRST EMBODIMENT

First System

Figure 1:
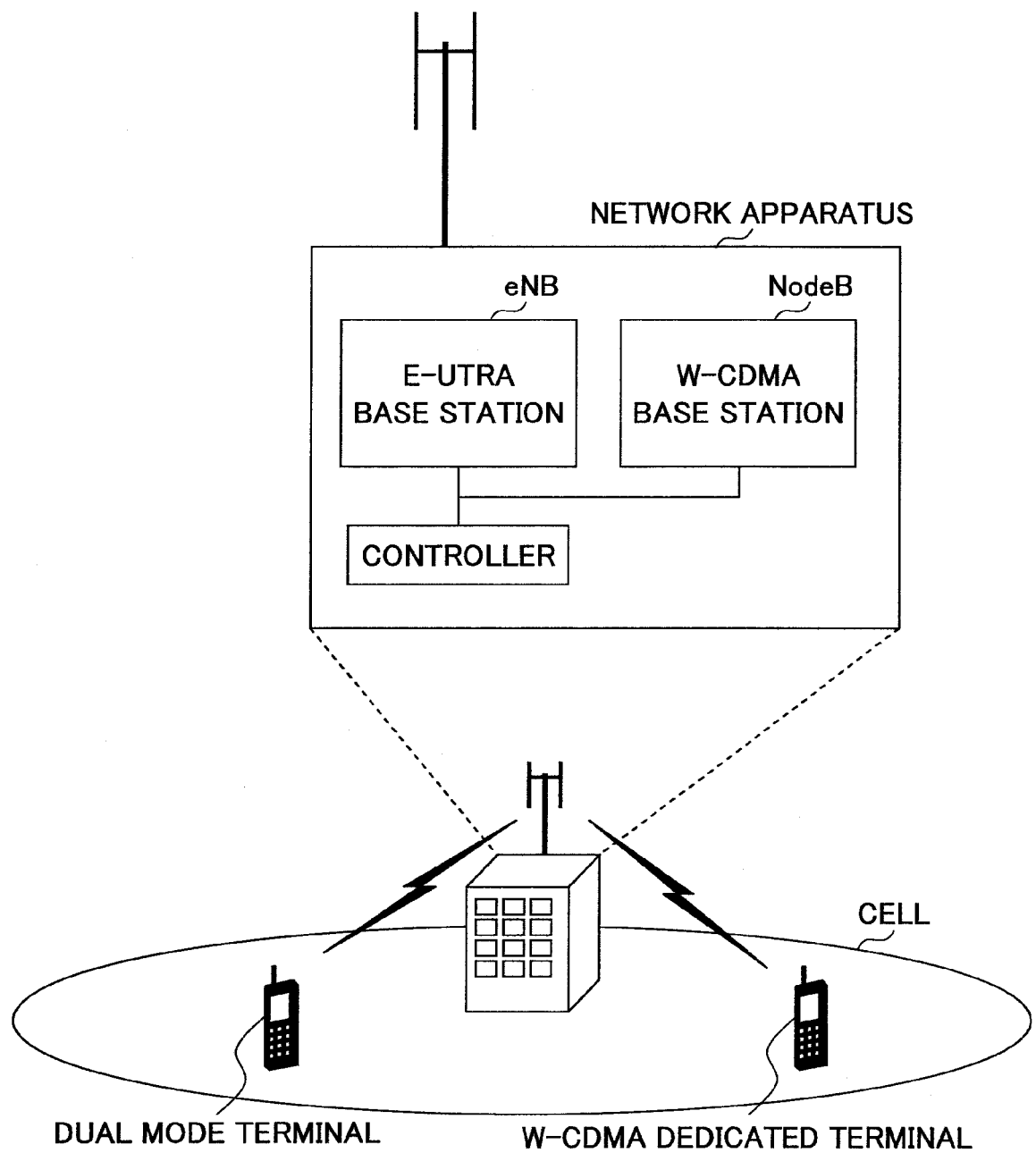
FIG. 1 illustrates an exemplary arrangement of a mobile communication system according to one embodiment of the present invention.

FIG. 1 illustrates a mobile communication system according to one embodiment of the present invention. A mobile communication system includes a conventional W-CDMA system and a next generation LTE system and operates them in the same area as illustrated. In the illustrated embodiment, the W-CDMA system applies a HSDPA/HSUPA (High Speed Downlink/Uplink Packet Access) scheme. In the W-CDMA system, the same system bandwidth (e.g., 5 MHz) is utilized in all cells. In the LTE system, different system bandwidths may be utilized for different systems, but options of the bandwidths (e.g., 1.25 MHz, 5 MHz, 10 MHz, 20 MHz) are predefined. Cell arrangements may be determined for the systems separately, but it is assumed in the present embodiment that the both systems are utilized together in at least some areas.

In FIG. 1, user apparatuses and a network apparatus are illustrated. The user apparatuses may include a terminal dedicated to the W-CDMA system (W-CDMA dedicated terminal), a terminal dedicated to the LTE system (LTE dedicated terminal) and a dual mode terminal capable of operating in both the W-CDMA system and the LTE system. For simplified illustration, the LTE dedicated terminal is not illustrated. Although a large number of user apparatuses may exist, only one W-CDMA dedicated terminal and one dual mode terminal are illustrated for simplified illustration.

The network apparatus includes a base station for the W-CDMA system (NodeB), a base station for the LTE system (eNB) and a controller.

The W-CDMA base station NodeB can communicate with the user apparatuses wirelessly and with an upper node in a wired manner. In the illustrated embodiment, the base station NodeB performs error correction encoding, data modulation, spread modulation and/or others on downlink signals. The base station NodeB also performs inverse spread, data demodulation, error correction decoding and/or others on uplink signals. Data modulation schemes for user data are adaptively changed depending on channel states in accordance with an AMC (Adaptive Modulation and Coding) scheme. The user data may be retransmitted in accordance with a HARQ (Hybrid Automatic Repeat reQuest) scheme. In the HSDPA/HDUPA scheme, radio resources are shared among multiple user apparatuses, and it is determined for each subframe when and which of the user apparatuses can use a shared channel. In other words, time scheduling is carried out.

The LTE base station eNB also can communicate with user apparatuses wirelessly and with an upper node in a wired manner. The base station eNB performs error correction encoding, data modulation, inverse Fourier transform and/or others on downlink signals. The base station eNB also performs Fourier transform, demapping, inverse Fourier transform, data demodulation, error correction decoding and/or others on uplink signals. The user data is segmented and/or concatenated appropriately. Data modulation schemes for the user data are adaptively changed depending on channel states in accordance with the AMC scheme. The user data is retransmitted in accordance with the HARQ scheme. Also in the LTE system, radio resources are shared among multiple user apparatuses, and it is determined when and which of the user apparatuses can use which of the radio resources for each subframe. In the LTE system, two-dimensional scheduling for time and frequency is carried out as opposed in the W-CDMA system. In addition, the base station eNB performs call operations such as setting and releasing communication channels in addition to management of itself and the radio resources. This is different from the W-CDMA system in that these operations are conducted by a node upper to the base station.

The controller according to the present embodiment determines which of the W-CDMA or the LTE system is to be utilized for communications with a user apparatus depending on the type of signals exchanged by the user apparatus and/or congestion. As stated above, the W-CDMA system is advantageous to the case where a small size of data arises periodically, for example, for every several milliseconds. Such data may be sound packets (VoIP), video conference signals, real time data or others. On the other hand, the W-CDMA system is not advantageous to some applications such as fast transmissions of many data. In contrast, the LTE system is suitable for the fast transmissions of many data. On the other hand, since overhead is attached to individual packets in principle in accordance with the LTE system, the LTE system is not advantageous for frequent transmission of small packets. The controller utilizes these characteristics of the systems to determine which of the systems is suitable for transmissions of signals by a user apparatus and indicates the determination to the user apparatus and a selected base station.

Second System

Figure 2:
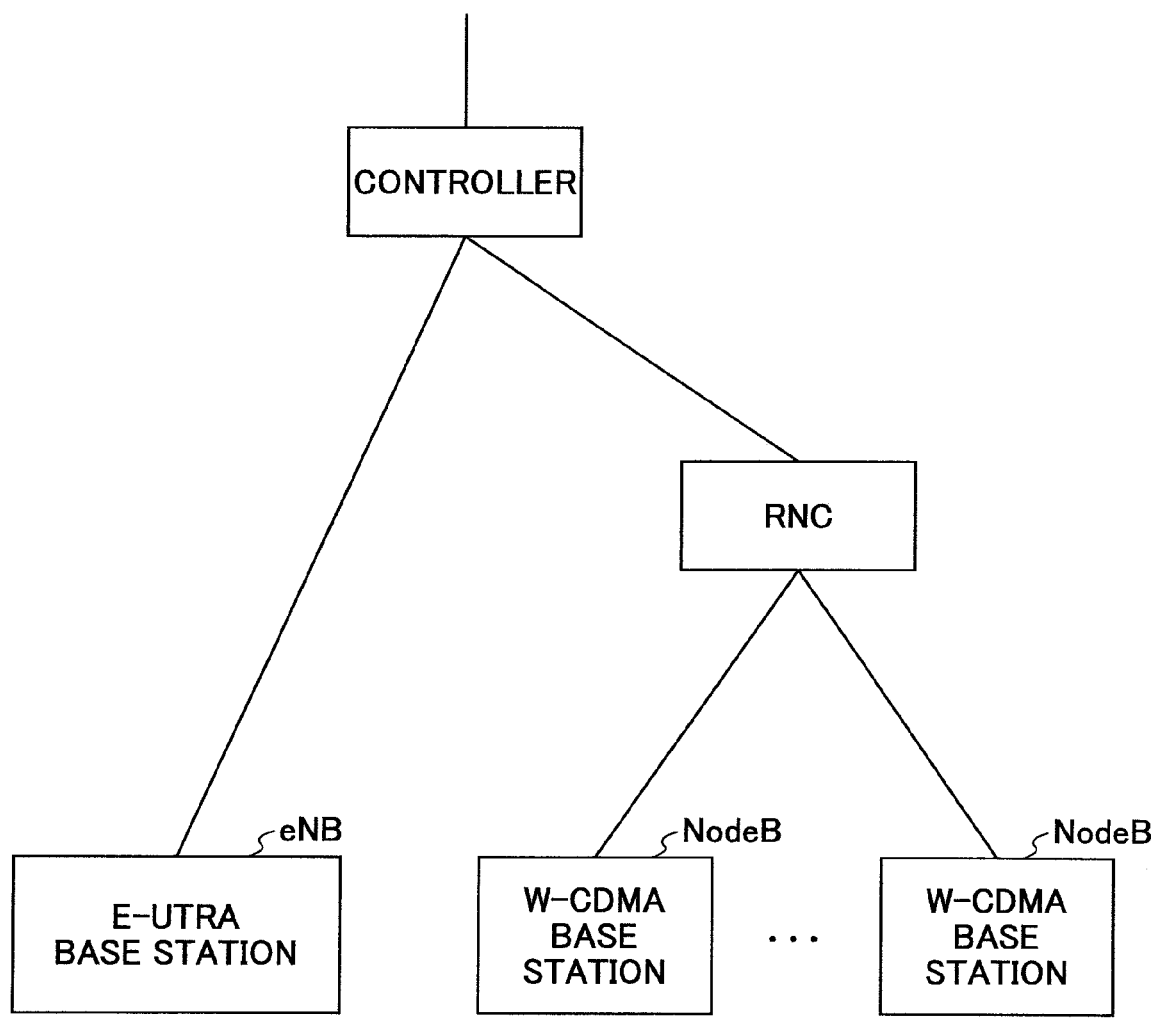
FIG. 2 illustrates another exemplary arrangement of a mobile communication system according to one embodiment of the present invention.

FIG. 2 illustrates another exemplary system arrangement. In the illustrated arrangement, the LTE base station eNB is coupled to the controller similar to FIG. 1, but the controller is in communication with the base station NodeB via a radio network controller (RNC). In the illustrated embodiment, the W-CDMA base station NodeB has no radio resource assignment function. Some operations such as radio resource assignment and handover control are carried out in the RNC. The radio resources are used in a circuit switching manner, and a connected user can exclusively use a line. In the illustrated W-CDMA system, inter-sector/cell diversity is applied, and transmit diversity and soft combining (maximum ratio combining) may be conducted.

[First Exemplary Operation]

Figure 3:
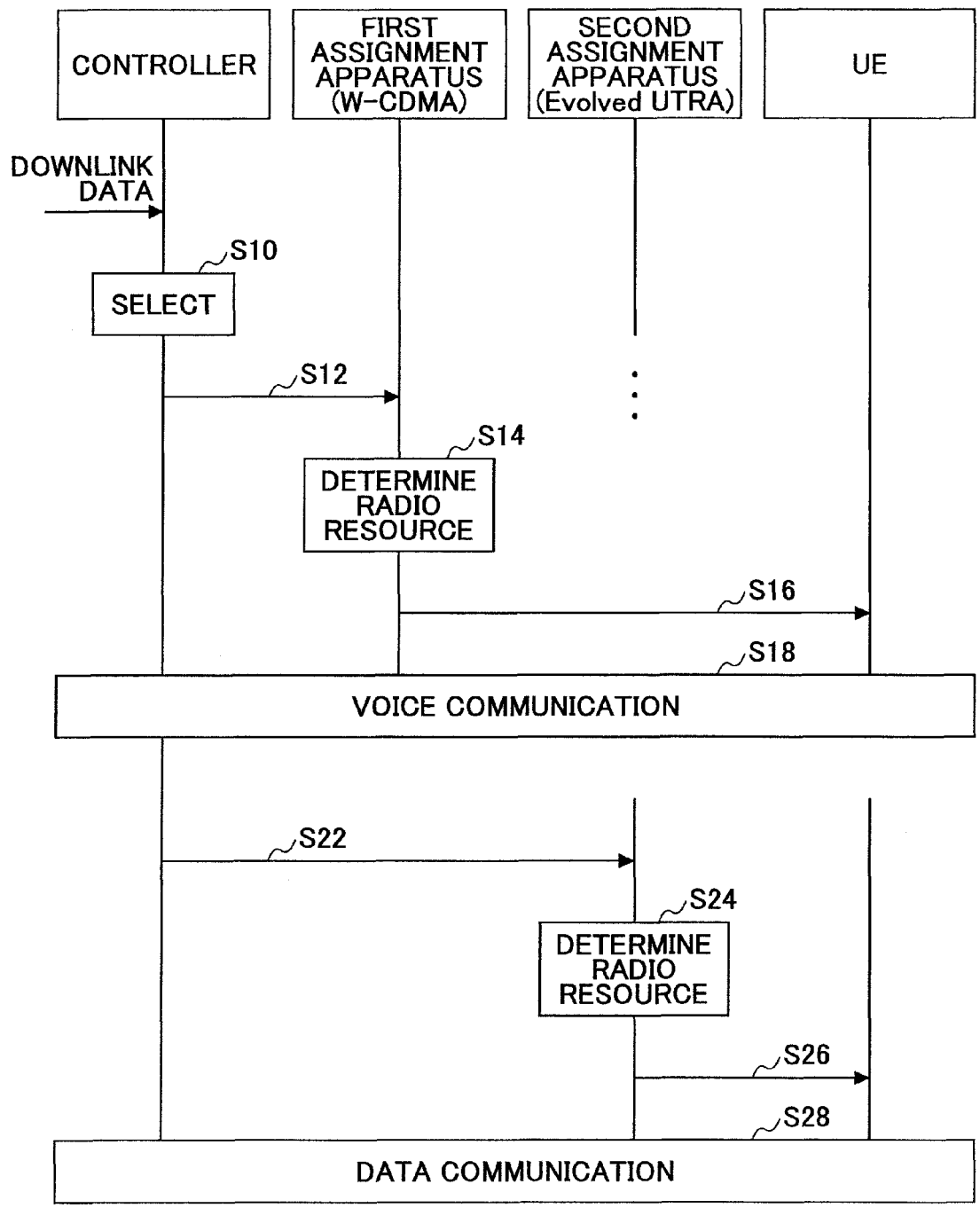
FIG. 3 is a flowchart illustrating an exemplary first operation according to one embodiment of the present invention.

FIG. 3 illustrates an exemplary first operation according to one embodiment of the present invention. In this exemplary operation, downlink data is transmitted to a dual mode terminal. The system arrangement illustrated in FIG. 1 or FIG. 2 may be employed. It is assumed that data destined for a user apparatus being a dual mode terminal arrives at the controller from an upper node in the network.

At step S10, it is determined which system is suitable for data transmissions to the user apparatus. The determination may be made based on criteria as set forth.

Determination criteria 1: If small data (e.g., sound packets (VoIP), video conference signals and real time data) frequently arises, the W-CDMA system is selected.

Determination criteria 2: If large data (e.g., high quality images) is transmitted, the LTE system is selected.

Determination criteria 3: If the system selected in accordance with determination criteria 1 and 2 is congested, the other system is reselected.

Determination criteria 4: Independent of determination criteria 1 and 2, an uncongested system is selected.

Determination criteria 5: If the degrees of congestion in the systems are not significantly different, either of the systems is selected in accordance with determination criteria 1 and/or 2.

These determination criteria are illustrative, and the system selection may be made in accordance with one or more of the determination criteria and/or other determination criteria. In the illustrated embodiment, the systems are selected alternatively, but one of three or more systems may be selected based on data types, congestion and/or others.

In downlink data transmissions to the W-CDMA dedicated terminal or the LTE dedicated terminal, the system selection cannot be made, and thus the determination of data types may not be made.

Step S12 is a sequence corresponding to the case where the W-CDMA system has been selected at step S10. In this case, an apparatus for assigning radio resources in the W-CDMA system (first assignment apparatus) is informed that the W-CDMA system has been selected. In the system as illustrated in FIG. 1, the first assignment apparatus is installed in the W-CDMA base station. On the other hand, in the system as illustrated in FIG. 2, the first assignment apparatus is installed in the RNC.

At step S14, radio resources such as spread codes are assigned for downlink data transmissions to a user apparatus.

At step S16, the user apparatus is paged to signal which of the radio resources are to be used for the downlink data transmissions. For simplified illustration, it seems that the paging to the user apparatus and the signaling of the radio resources are conducted together, but they are separately performed in different sequences.

At step S18, downlink data such as VoIP is transmitted to the user apparatus.

Step S22 is a sequence corresponding to the case where the LTE system has been selected at step S10. In this case, an apparatus for assigning radio resources in the LTE system (second assignment apparatus) is informed that the LTE system has been selected. The second assignment apparatus is installed in the E-UTRA base station as illustrated in FIG. 1 or FIG. 2.

At step S24, the radio resources such as resource blocks are assigned for downlink data transmissions to a user apparatus.

At step S26, the user apparatus is paged to signal which of the radio resources are to be used for downlink data transmissions. For simplified illustration, it seems that the paging of the user apparatus and the signaling of the radio resources are conducted together, but they are separately performed in different sequences. The radio resources are signaled in a downlink L1/L2 control channel attached to a PDSCH (Physical Downlink Shared Channel).

At step S28, downlink data such as high quality images is transmitted to the user apparatus.

[Second Exemplary Operation]

FIG. 4 illustrates a second exemplary operation according to one embodiment of the present invention. In this exemplary operation, a dual mode terminal transmits uplink data. The system arrangement as illustrated in FIG. 1 or FIG. 2 may be utilized. A user apparatus being a dual mode terminal has a system selection function. At step S11, the W-CDMA system or the LTE system is selected depending on the type of uplink data arising in the user apparatus. In this selection, system congestion cannot be taken into account, and accordingly determination criteria 1 and/or 2 described in conjunction with the first exemplary operation (step S10) are applied.

At step S13, the first assignment apparatus is informed that the user apparatus has selected the W-CDMA system.

At step S14, radio resources such as spread codes are assigned for downlink data transmissions to the user apparatus.

At step S16, the user apparatus is paged to signal which of the radio resources are to be used for the downlink data transmissions.

At step S18, uplink data such as VoIP is communicated from the user apparatus.

Step S22 is a sequence corresponding to the case where the LTE system has been selected at step S11. In this case, the second assignment apparatus in the LTE system is informed that the LTE system has been selected.

At step S24, radio resources such as resource blocks are assigned for downlink data transmissions to the user apparatus.

At step S26, the user apparatus is paged to signal which of the radio resources are to be used for the downlink data transmissions. The radio resources are signaled in a downlink L1/L2 control channel attached to a PDSCH (Physical Downlink Shared Channel).

At step S28, uplink data such as high quality images is communicated from the user apparatus.

[Third Exemplary Operation]

FIG. 5 illustrates a third exemplary operation according to one embodiment of the present invention. In this exemplary operation, a dual mode terminal transmits uplink data. The system arrangement as illustrated in FIG. 1 or FIG. 2 may be utilized. A user apparatus being a dual mode terminal has a data type determination function but cannot determine which of the systems is to be used for data transmissions as opposed to FIG. 4.

At step S8, the type of uplink data arising in the user apparatus is determined. For example, the determination may be made based on determination as to whether the uplink data corresponds to frequently arising small data or large data.

At step S9, the determination at step S8 is indicated to the controller. It is assumed that the determination is indicated in a predefined sequence. The determination may be indicated via the E-UTRA base station eNB or the W-CDMA base station NodeB having a resource assignment function. Alternatively, the determination may be indicated via the RNC technically. Note that from the standpoint of reduced transmission delay required to indicate the determination, the E-UTRA base station eNB may be used, or the W-CDMA base station NodeB having the resource assignment function may be preferred.

At step S10, it is determined which of the systems is suitable for data transmissions to the user apparatus based on the determination of the data type. Since the data type has been determined by the user apparatus, the system selection is made at step S10 based on one or more of determination criteria 3-5.

Step S12 is a sequence corresponding to the case where the W-CDMA system has been selected at step S10. In this case, the first assignment apparatus in the W-CDMA system is informed that the W-CDMA system has been selected.

At step S14, radio resources such as spread codes are assigned for uplink data transmissions from the user apparatus.

At step S16, it is signaled which of the radio resources are to be used for the uplink data transmissions.

At step S18, uplink data such as VoIP is communicated from the user apparatus.

Step S22 is a sequence corresponding to the case where the LTE system has been selected at step S10. In this case, the second assignment apparatus in the LTE system is informed that the LTE system has been selected.

At step S24, resources blocks such as resource blocks are assigned for the uplink data transmissions from the user apparatus.

At step S26, it is signaled which of the radio resources are to be used for the uplink data transmissions. The radio resources are signaled in a downlink L1/L2 control channel.

At step S28, uplink data such as high quality images is communicated from the user apparatus.

The present invention has been described with reference to the specific embodiments, but the embodiments are simply illustrative and variations, modifications, alterations and substitutions could be contrived by those skilled in the art. In the above description, some specific numerical values are used for better understanding of the present invention. Unless specifically indicated, however, these numerical values are simply illustrative and any other suitable values may be used. Separation of the embodiments or items are not essential to the present invention, and descriptions in two or more embodiments or items may be combined as needed. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This international patent application is based on Japanese Priority Application No. 2007-286738 filed on Nov. 2, 2007, the entire contents of which are hereby incorporated by reference.

The invention claimed is:

1. A mobile communication system, comprising:
a first assignment unit configured to assign radio resources to a user in a W-CDMA system;
a second assignment unit configured to assign radio resources to a user in a LTE system;
a dual mode terminal capable of communicating in the W-CDMA system and the LTE system; and
a selection unit configured to select the first assignment unit or the second assignment unit based on a data type of user traffic data in communication with the dual mode terminal and congestion degrees of the W-CDMA system and the LTE system, wherein:
  i) in a case where the congestion degrees of the W-CDMA system and the LTE system differ from each other by less than a predefined value, if the user traffic data corresponds to periodically arising small-sized data, the selection unit causes the first assignment unit to assign a radio resource in the W-CDMA system for the user traffic data, and if the user traffic data does not correspond to periodically arising small-sized data, the selection unit causes the second assignment unit to assign a radio resource in the LTE system for the user traffic data, and
  ii) in a case where the congestion degrees of the W-CDMA system and the LTE system differ from each other by greater than or equal to the predefined value, the selection unit selects a less congested one of the W-CDMA system and the LTE system, and
wherein the assignment unit selected by the selection unit assigns the radio resources for the dual mode terminal and signals the assigned radio resources to the dual mode terminal.

2. The mobile communication system as claimed in claim 1, wherein the first assignment unit is installed in a base station in the W-CDMA system.

3. The mobile communication system as claimed in claim 1, wherein the first assignment unit is installed in a radio network controller for controlling a base station in the W-CDMA system.

4. The mobile communication system as claimed in claim 1, wherein the second assignment unit is installed in a base station in the LTE system.

5. A controller for use in a composite communication system including a first assignment unit for assigning radio resources to a user in a W-CDMA system, a second assignment unit for assigning radio resources to a user in a LTE system and a dual mode terminal in communication with the W-CDMA system and the LTE system, comprising:
a selection unit configured to select the first assignment unit or the second assignment unit based on a data type of user traffic data in communication with the dual mode terminal and congestion degrees of the W-CDMA system and the LTE system, wherein:
  i) in a case where the congestion degrees of the W-CDMA system and the LTE system differ from each other by less than a predefined value, if the user traffic data corresponds to periodically arising small-sized data, the selection unit causes the first assignment unit to assign a radio resource in the W-CDMA system for the user traffic data, and if the user traffic data does not correspond to periodically arising small-sized data, the selection unit causes the second assignment unit to assign a radio resource in the LTE system for the user traffic data, and
  ii) in a case where the congestion degrees of the W-CDMA system and the LTE system differ from each than or equal to the predefined value, the selection unit selects a less congested one of the W-CDMA system and the LTE system; and
a signaling unit configured to signal the first or the second assignment unit that the selection has been made so that the selected assignment unit assigns the radio resources for the dual mode terminal and signals the assigned radio resources to the dual mode terminal.

6. The controller as claimed in claim 5, wherein the controller is installed in a base station in the LTE system.

7. A control method implemented by a controller in a composite communication system including a first assignment unit for assigning radio resources to a user in a W-CDMA system, a second assignment unit for assigning radio resources to a user in a LTE system, a dual mode terminal in communication with the W-CDMA system and the LTE system and a selection unit for selecting the first assignment unit or the second assignment unit, the method comprising:

selecting the first assignment unit or the second assignment unit based on a data type of user traffic data in communication with the dual mode terminal and congestion degrees of the W-CDMA system and the LTE system, wherein:

i) in a case where the congestion degrees of the W-CDMA system and the LTE system differ from each other by less than a predefined value, if the user traffic data corresponds to periodically arising small-sized data, the selecting comprises causing the first assignment unit to assign a radio resource in the W-CDMA system for the user traffic data, and if the user traffic data does not correspond to periodically arising small-sized data, the selecting comprises causing the second assignment unit to assign a radio resource in the LTE system for the user traffic data, and ii) in a case where the congestion degrees of the W-CDMA system and the LTE system differ from each other by greater than or equal to the predefined value, the selection unit selects a less congested one of the W-CDMA system and the LTE system;

signaling the first or the second assignment unit that the selection has been made; and the first assignment unit or the second assignment unit assigning the radio resources for the dual mode terminal and signaling the assigned radio resources to the dual mode terminal.

8. The method as claimed in claim 7, wherein the dual mode terminal determines a type of the user traffic data in communication with the dual mode terminal and signals the determined type to the selection unit in a predefined manner.

* * * * *